(12) United States Patent
Jackson et al.

(10) Patent No.: US 10,548,173 B2
(45) Date of Patent: *Jan. 28, 2020

(54) NETWORK AND CONNECTED DEVICES FOR EMERGENCY RESPONSE AND ROADSIDE OPERATIONS

(71) Applicant: WHELEN ENGINEERING COMPANY, INC., Chester, CT (US)

(72) Inventors: Cole Jackson, Cheshire, CT (US); Caleb Garrett, Essex, CT (US)

(73) Assignee: WHELEN ENGINEERING COMPANY, INC., Chester, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/291,517

(22) Filed: Mar. 4, 2019

(65) Prior Publication Data
US 2019/0200402 A1  Jun. 27, 2019

Related U.S. Application Data

(63) Continuation of application No. 15/942,628, filed on Apr. 2, 2018, now Pat. No. 10,244,564, which is a (Continued)

(51) Int. Cl.
*H04M 11/04* (2006.01)
*H04W 76/10* (2018.01)
(Continued)

(52) U.S. Cl.
CPC .............. *H04W 76/10* (2018.02); *B60Q 1/52* (2013.01); *G08B 21/0446* (2013.01);
(Continued)

(58) Field of Classification Search
CPC .......... H04W 76/10; H04W 4/38; H04W 4/44
See application file for complete search history.

(56) References Cited

U.S. PATENT DOCUMENTS 5,457,449 A   10/1995  Kuning et al.
5,552,767 A    9/1996  Toman
(Continued)

FOREIGN PATENT DOCUMENTS

WO   2016118575 A1   7/2016

OTHER PUBLICATIONS

International Search Report and Written Opinion dated Jan. 18, 2018 (PCT/US2017/060341).
(Continued)

*Primary Examiner* — Justin Y Lee
(74) *Attorney, Agent, or Firm* — Dilworth IP, LLC (57) ABSTRACT

A self-assembling network is configured to automatically and dynamically connect devices used in operations carried out on or near roads bearing vehicle and pedestrian traffic. An automatic, ad hoc network connecting existing and new devices can be used to enhance safety by gathering and exchanging safety critical information. In some cases, existing equipment can be augmented with a network controller and radio frequency communications to permit the devices to join a wireless local network and exchange information over the network. New devices, including wearable devices, can be configured to act as nodes on the wireless local network. Establishing the relative position of vehicles, sensors, wearables, and other nodes on the disclosed ad hoc wireless network allows the coordination of functions based on position.

20 Claims, 7 Drawing Sheets

Related U.S. Application Data continuation of application No. 15/805,659, filed on Nov. 7, 2017.

(60) Provisional application No. 62/418,733, filed on Nov. 7, 2016.

(51) Int. Cl.

| | | |
|---|---|---|
| *G08B 21/04* | (2006.01) | |
| *G08G 1/0955* | (2006.01) | |
| *G08G 1/0965* | (2006.01) | |
| *H04L 29/08* | (2006.01) | |
| *H04W 4/38* | (2018.01) | |
| *H04W 4/44* | (2018.01) | |
| *G08G 1/16* | (2006.01) | |
| *H04W 4/02* | (2018.01) | |
| *B60Q 1/52* | (2006.01) | |
| *H04W 84/00* | (2009.01) | |
| *H04W 76/50* | (2018.01) | |
| *H04W 76/14* | (2018.01) | |
| *H04W 4/90* | (2018.01) | |
| *H04W 84/18* | (2009.01) | |

(52) U.S. Cl.
CPC ......... *G08G 1/0955* (2013.01); *G08G 1/0965* (2013.01); *G08G 1/166* (2013.01); *H04L 67/10* (2013.01); *H04W 4/023* (2013.01); *H04W 4/38* (2018.02); *H04W 4/44* (2018.02); *H04W 84/005* (2013.01); *H04W 4/90* (2018.02); *H04W 76/14* (2018.02); *H04W 76/50* (2018.02); *H04W 84/18* (2013.01)

(56) References Cited

U.S. PATENT DOCUMENTS

| | | | |
|---|---|---|---|
| 5,661,474 A | 8/1997 | Douglas | |
| 5,777,457 A | 7/1998 | Lee | |
| 6,075,450 A | 6/2000 | Clark | |
| 6,249,232 B1 | 6/2001 | Tamura et al. | |
| 6,288,651 B1 | 9/2001 | Souza | |
| 6,405,132 B1 | 6/2002 | Breed et al. | |
| 6,529,831 B1 | 3/2003 | Smith et al. | |
| 6,559,774 B2 | 5/2003 | Bergan et al. | |
| 6,580,981 B1 | 6/2003 | Masood et al. | |
| 6,630,892 B1 * | 10/2003 | Crockford | B60W 40/04 340/436 |
| 6,765,495 B1 | 7/2004 | Dunning et al. | |
| 6,791,471 B2 | 9/2004 | Wehner et al. | |
| 6,985,089 B2 | 1/2006 | Liu et al. | |
| 7,541,743 B2 | 6/2009 | Salmeen et al. | |
| 7,572,022 B2 | 8/2009 | Groeneweg | |
| 8,115,650 B2 | 2/2012 | Dasilva et al. | |
| 8,248,968 B2 | 8/2012 | Handforth et al. | |
| 8,350,721 B2 | 1/2013 | Carr | |
| 8,624,727 B2 | 1/2014 | Saigh et al. | |
| 8,747,336 B2 | 6/2014 | Tran | |
| 8,842,021 B2 | 9/2014 | Behm et al. | |
| 8,918,251 B2 | 12/2014 | Tarnutzer et al. | |
| 8,954,261 B2 | 2/2015 | Das et al. | |
| 8,963,705 B2 | 2/2015 | Miller et al. | |
| 9,293,045 B2 | 3/2016 | Bostick et al. | |
| 9,333,913 B1 | 5/2016 | Elders et al. | |
| 9,437,109 B1 | 9/2016 | Stafford et al. | |
| 9,561,778 B2 | 2/2017 | Atoche | |
| 9,714,033 B2 | 7/2017 | Ebrahimi Afrouzi | |
| 10,244,564 B2 * | 3/2019 | Jackson | B60Q 1/52 |
| 2002/0167934 A1 | 11/2002 | Carter et al. | |
| 2005/0065711 A1 | 3/2005 | Dahlgren et al. | |
| 2007/0188348 A1 | 8/2007 | Bauer et al. | |
| 2007/0195808 A1 | 8/2007 | Ehrlich et al. | |
| 2007/0213922 A1 | 9/2007 | Van Buer et al. | |
| 2009/0256706 A1 | 10/2009 | Brown | |
| 2010/0285771 A1 | 11/2010 | Peabody | |
| 2011/0227756 A1 | 9/2011 | Otero et al. | |
| 2012/0126996 A1 | 5/2012 | Mccarthy | |
| 2012/0176254 A1 | 7/2012 | Imanaga et al. | |
| 2014/0085106 A1 | 3/2014 | Clifford et al. | |
| 2015/0092642 A1 | 4/2015 | Geboff et al. | |
| 2015/0264554 A1 | 9/2015 | Addepalli et al. | |
| 2016/0100302 A1 | 4/2016 | Barash et al. | |
| 2016/0140834 A1 | 5/2016 | Tran | |
| 2016/0200253 A1 | 7/2016 | Braunberger et al. | |
| 2016/0304028 A1 | 10/2016 | Hathaway et al. | |
| 2016/0345319 A1 | 11/2016 | Zhou et al. | |
| 2016/0360965 A1 | 12/2016 | Tran | |
| 2017/0331745 A1 | 11/2017 | Boss et al. | |
| 2018/0079359 A1 | 3/2018 | Park et al. | |

OTHER PUBLICATIONS

Ergen Sinem C. et al., "TDMA scheduling algorithms for wireless sensor networks," Wireless Netw. 16:985-997 (2010).

Thread Group, Inc., "Thread Stack Fundamentals," initial release Nov. 29, 2014.

\* cited by examiner

NETWORK AND CONNECTED DEVICES FOR EMERGENCY RESPONSE AND ROADSIDE OPERATIONS

BACKGROUND

This application relates to systems, equipment and methods employing a self-assembling wireless local network of devices to enhance the safety of personnel conducting operations on or near working roadways including law enforcement, emergency response, construction sites, and roadside service providers such as tow trucks.

It is well-known that operations conducted on or beside traffic bearing roadways are extremely hazardous, with other motorists potentially colliding with equipment and personnel causing injury and death. Visual and audible warnings are commonly used to warn approaching motorists and pedestrians of roadside operations, and these warnings have been successful in reducing accidents. However, significant risks remain and there is an opportunity to deploy recently developed communications and sensor technology to further increase the safety of roadside personnel.

Currently, equipment used for operations on or near working roads are stand-alone devices, the operation of which is not coordinated with other devices. For example, if two or more emergency vehicles are stopped in a row at the scene of an accident, it is common for all of the vehicles to display warning light signals of various types. The warning light signals are not coordinated and can generate a confusing glare to the approaching motorist, pedestrian, or other emergency responders. It is common for emergency vehicles in the front of the line to continue projecting warning light signals rearwardly, which can blind emergency responders approaching the accident from behind the first vehicle. Ideally, only the rear-most vehicle would display warning lights to the rear, to warn approaching traffic. Coordinated traffic directing signals would also be less confusing to approaching traffic. Currently, there is no way to effectively coordinate the warning signal activity among several emergency vehicles at the scene of an accident, except to manually set each vehicle's warning system to the desired setting. Even then, the flash patterns emitted by each vehicle's lights will not be coordinated in time with the other vehicle flash patterns.

Warning signals from emergency vehicles, service vehicles and construction equipment can be augmented with traffic guiding devices such as cones, portable barriers, and portable lights that generate traffic guiding light signals or illuminated words. The effectiveness of such equipment is enhanced when the activity of the devices is coordinated. Further improvements are possible if the traffic guiding devices include sensors to detect approaching vehicles or objects that will enter a safety margin around the work zone. The information from such sensors is most effective if coordinated and communicated to personnel in the work zone.

It is now common for motor vehicles equipped for road service, construction, and emergency response to have computerized devices that control and coordinate available audible and visual warning signals generated by each of the vehicles. These computerized devices have computer processors, memory, and limited communication capability. Communication is typically limited to the control of signal devices on a motor vehicle from a central module. Some communication between the central module and the vehicle communication bus may be employed to obtain information about the status of the vehicle, including whether the vehicle is parked or moving, braking, speed, heading, etc.

There is an opportunity to enhance safety of emergency responders, construction crews and road service personnel by connecting devices into a wireless local network to exchange information and coordinate warning signal and other activity when responding to an emergency, at crime scenes, emergency response locations, and work zones.

SUMMARY OF THE INVENTION

The disclosure encompasses methods of using networked devices to enhance first responder safety, a system of networked programmable devices programmed to carry out the disclosed methods, and devices including computer usable medium having computer readable program code for carrying out the disclosed methods. Programmable devices may include a user interface allowing a user to receive information from the device and input commands to the device, memory for storing program code, a processor for executing the code and a communications interface for communicating with other devices on the network.

A self-assembling network is configured to automatically and dynamically connect devices used in operations carried out on or near roads bearing vehicle and pedestrian traffic. An automatic, ad hoc network connecting existing and new devices can be used to enhance safety by gathering and exchanging safety critical information. In some cases, existing equipment can be augmented with a network controller and radio frequency communications to permit the devices to join a wireless local network and exchange information over the network. New devices, including wearable devices, can be configured to act as nodes on the wireless local network.

According to aspects of the disclosure, emergency vehicles from a first responder organization such as a state, county, or city police or fire department are provided with wireless communication equipment (transceivers) and configured to automatically join an ad hoc local network when within range of the wireless communication equipment of other nodes. The vehicles may be nodes on the network and communications between vehicles over the network may be used to coordinate the functionality of warning equipment on the vehicles. Vehicles on the network may also exchange information relating to vehicle position, speed, heading, braking, (generally referred to as "vehicle telematics") for the purpose of coordinating the functions of warning equipment on the vehicles based on the relative position of the vehicles. Vehicle telematics transferred between vehicles may also be used to improve first responder safety by providing enhanced warning to a trailing vehicle of rapid deceleration of the lead vehicle. Peripheral devices such as devices worn on the person of a first responder are wirelessly connected to the vehicle and by extension to the network. Portable devices such as traffic safety cones or barriers are wirelessly connected to the network and configured to transfer messages and commands among connected devices. Portable devices may be equipped with sensors to detect encroachment upon or intrusion into a safety zone at the scene of an emergency or work zone.

Position detection may be determined by global positioning satellite (GPS) or more accurately by differential global positioning satellite (DGPS) as is known in the art. Position accuracy can be enhanced using dead reckoning, vehicle telematics, and sensors arranged on the vehicles, wearable devices or portable nodes such as traffic cones or barriers. Sensors include micro-electro-mechanical (MEM) sensors, accelerometers, gyroscopes, magnetometers, cameras, ultrasonic sensors, infrared or laser radar, and RFID tags. Vehicle navigation systems may also provide information that can be used to improve the accuracy of position detection. Vehicle navigation systems and related map databases allow vehicles to detect their position on a roadway and can be used in conjunction with other position sensing methods to determine the position of vehicles relative to each other. Establishing the relative position of vehicles, sensors, wearables, and other nodes on the disclosed ad hoc wireless network allows the coordination of functions based on position.

DETAILED DESCRIPTION

A wireless local network 10 is employed to automatically and dynamically connect vehicles, traffic directing apparatus and wearable devices into a system 200 to enhance the safety of first responders conducting operations on or near roadways. One example of a network topology compatible with the disclosed system 200 and methods is a wireless mesh network. A mesh network is a local network topology in which the nodes connect directly, dynamically, and non-hierarchically to as many other nodes as possible and cooperate with one another to efficiently route data among the nodes. Mesh networks dynamically self-organize and self-configure, which can reduce installation overhead. The ability to self-configure enables dynamic distribution of workloads, particularly in the event that a few nodes should fail. This in turn contributes to fault-tolerance and reduced maintenance costs. The disclosed wireless local network is self-configuring and conducts many functions without requiring intervention from personnel using the equipment connected to the network, allowing them to focus on their work.

Mesh topology may be contrasted with conventional star/tree local network topologies in which devices are directly linked to only a small subset of other devices, and the links between the devices are hierarchical. A mesh is a network topology in which each node relays data for the network. All mesh nodes cooperate in the distribution of data in the network, so devices that are out of range from each other can communicate though other devices between them. Mesh networks can be designed to have no single point of failure. Devices that perform special functions can be replaced by other devices equipped for the special function. There may be some special functions that do not have backup capability, for example a device that acts as a gateway between the mesh network and the internet. If such a gateway loses power, then there may be no way to switch to another gateway.

Figure 1:
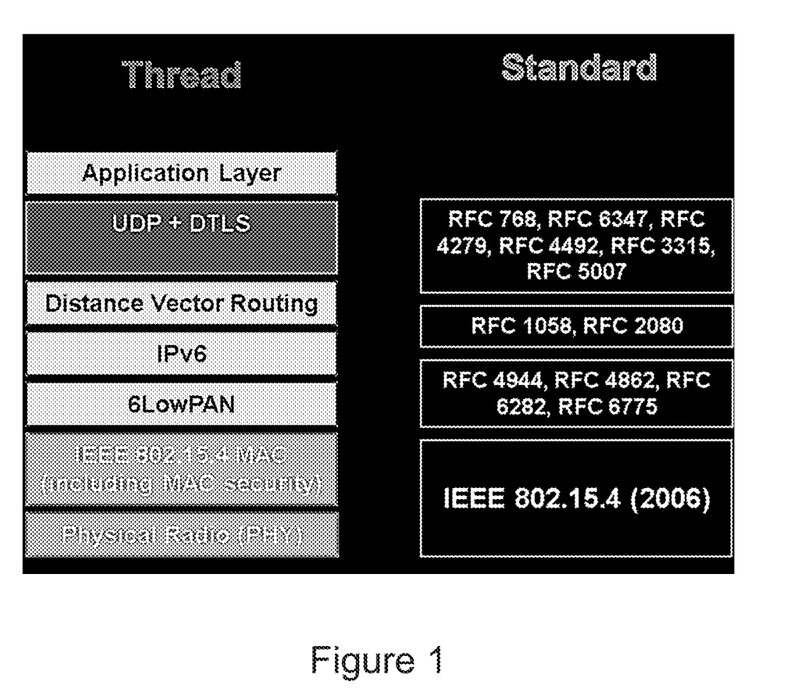
FIG. 1 graphically illustrates the layers in a communication protocol stack and the associated international standards that apply to each layer in the stack.

One example of a protocol for device-to-device communication over a wireless local network is the Thread stack, developed by Thread Group, Inc. and is used in this disclosure as a representative standard that can be used as the basis for security, communications, and data transfer on a mesh network. FIG. 1 is a graphical representation of the layers in the Thread protocol on the left, with the standards relevant to the content and operation of each layer to the right. Radio frequency (RF) communications between nodes on a Thread-based mesh network are governed by IEEE 802.15.4, which defines a Medium Access Control (MAC) layer operating in the 2.4 GHz band at a data rate of 250 kbps. The MAC layer includes MAC security for encrypting communications on the mesh network for enhanced security.

Thread uses as its RF (Radio Frequency) connectivity protocol the IEEE 802.15.4 communication standard which is specifically designed for low-rate, low-power WPANs (Wireless Personal Area Networks). Thread employs IPv6 connectivity that allows devices to communicate with one another, access services in the cloud, or interact with the user through Thread mobile applications. The need to unify IPv6 and 802.15.4 technologies was resolved by the development of a layer that provides smooth adaptation between the IPv6 networking layer requirements and 802.15.4 link layer capabilities. This layer is called 6LoWPAN and is illustrated FIG. 1.

MAC layer encryption and integrity protection is used on messages based on keys established and configured by the higher layers of the software stack. Nodes are authenticated to the network by authorized personnel using a device known as a commissioner and must share the same network key. A commissioner is usually a device separate from the network, such as a smartphone, that can communicate with the network and provide the new device with the necessary security information to join the network. The commissioner device may also be a part of the network itself, or a dedicated node.

Figure 2:
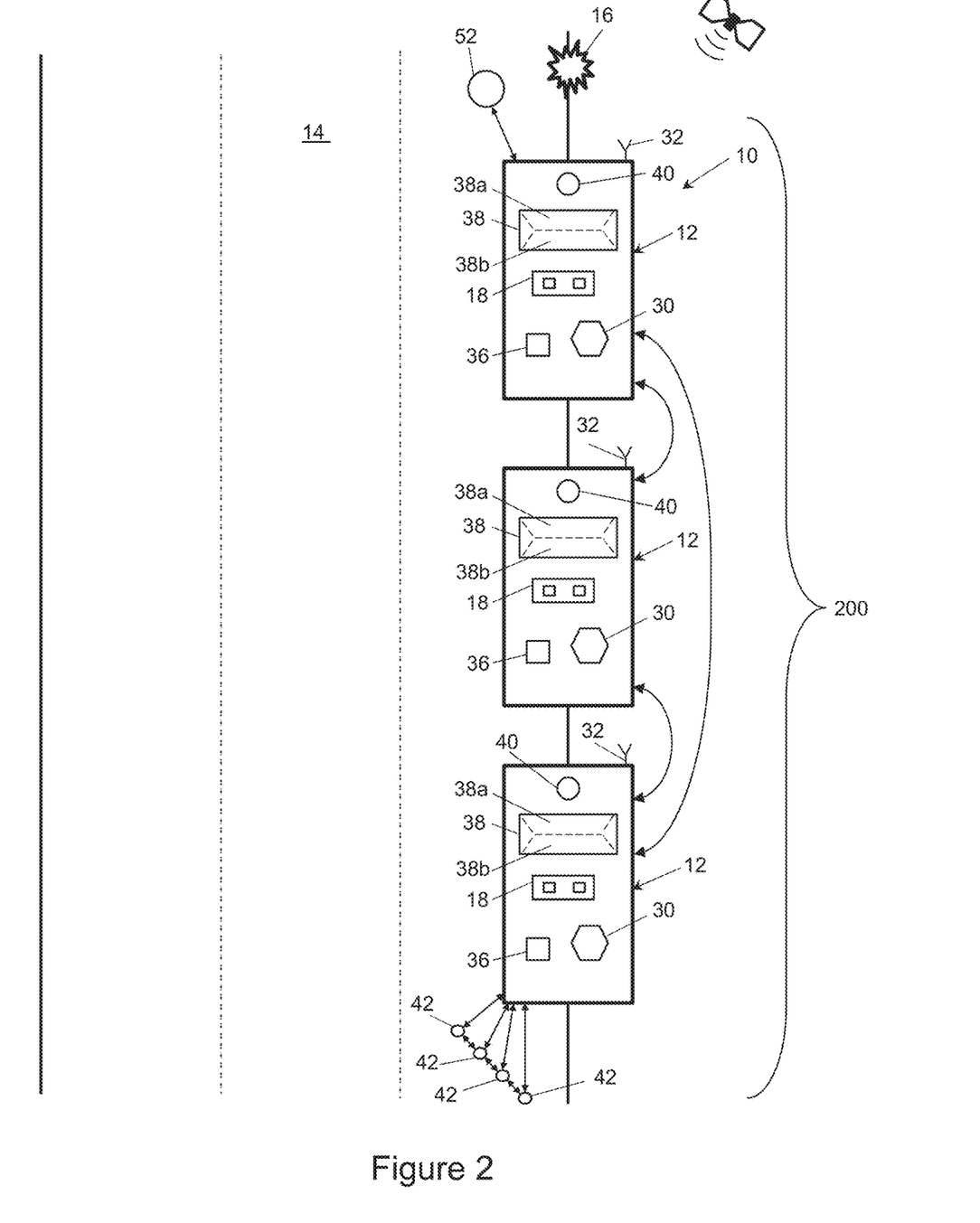
FIG. 2 illustrates an example of a system of devices connected by a wireless local network according to aspects of the present disclosure.
Figure 3:
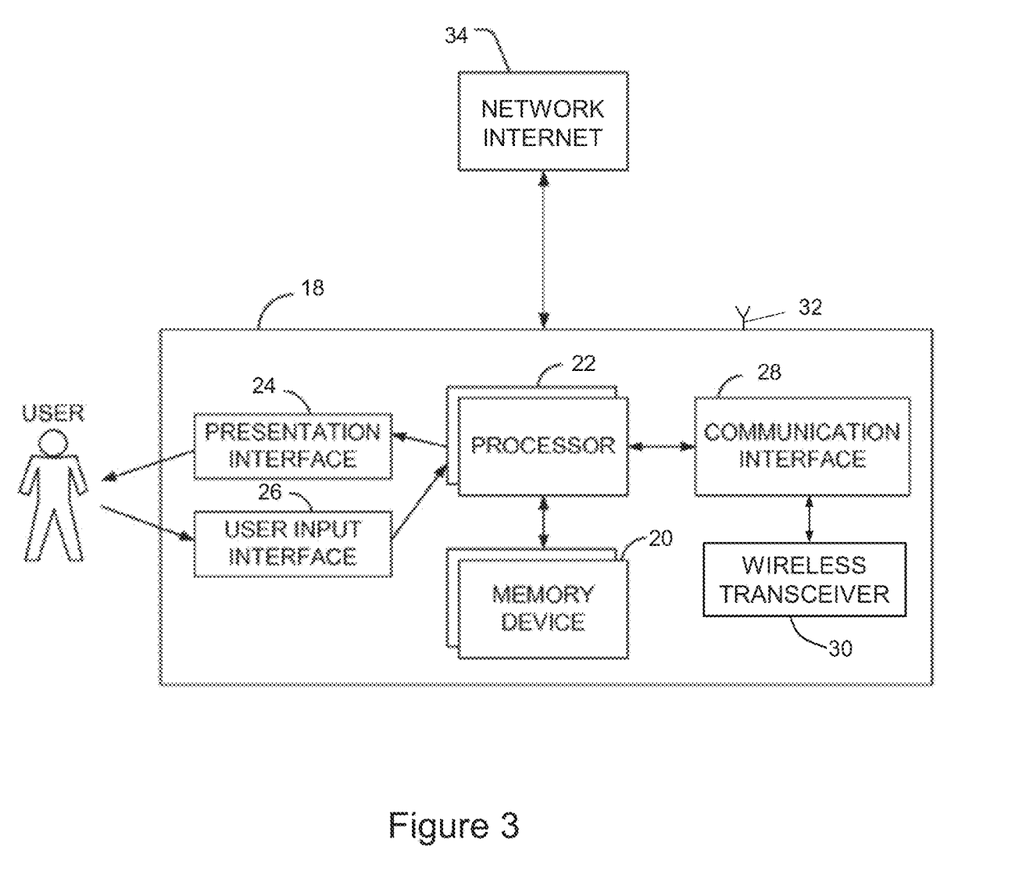
FIG. 3 is a functional block diagram of an exemplary controller for a device in the disclosed system and wireless local network.

The wireless local network in this disclosure will be discussed in terms of "nodes," which is used interchangeably with "device" or "vehicle." Each node represents one point in a mesh network. FIG. 2 illustrates a representative mesh network 10 in which three emergency vehicles 12 are connected to each other. A representative roadway 14 includes an incident 16 to which the emergency vehicles 12 are responding. Emergency vehicles 12 may include police, fire, ambulance/EMT and rescue vehicles, as well as DOT, wreckers and tow trucks. Each vehicle 12 includes a controller 18 with memory 20, a processor 22 and program instructions stored in memory 20 for execution by the processor 22, as shown in greater detail in FIG. 3. The controller 18 also includes a presentation interface 24 to present information to a user, and a user input interface 26, for the user to interact with the controller 18. The controller 18 includes a communications interface 28 to manage communications between the controller and other devices, including devices on the disclosed wireless local network 10 via a wireless transceiver 30. The controller 18 is operatively connected to an antenna 32 for accessing the internet 34 via cellular communications systems as is known in the art. According to aspects of the disclosure, each vehicle 12 is equipped with a dedicated wireless transceiver 30 compatible with a low power, local area network such as a wireless mesh network. The controller 18 of each vehicle 12 may be configured to dynamically and automatically connect to other vehicles 12 when the wireless transceivers 30 are within range. FIG. 2 illustrates a situation where three vehicles 12 are within range of each other and are all connected to each other in a fully meshed topology to form a wireless local network 10. Smart devices, such as cell phones can be nodes on the wireless local network 10.

Each vehicle 12 is equipped with at least one multifunction audio warning device 36 (such as an electronic siren) and at least one multifunction visual warning device 38 (such as a lightbar). The multifunction audio device 36 is capable of generating several audible warning sounds, such as siren tones known as a wail, yelp, and air horn. The multifunction visual warning device 38 may be a lightbar equipped with several lights capable of generating a variety of visual warning signals, which may include flashing lights, steady lights, alternating wig wag flash patterns, sequential traffic directing patterns, as is known in the art. The light bar 38 may be configured to generate visual warning light signals projecting away from the front 38a and/or rear 38b of the lightbar 38. The lightbar 38 may also capable of selectively producing light to illuminate the area surrounding the vehicle 12, with the illumination light directed toward the area in front, to the sides, and/or to the rear of the vehicle 12. The three vehicles 12 can implement a coordinated flash pattern where the pattern incorporates the visual warning signal devices 38 of all three vehicles 12. When another vehicle 12 comes within range of the wireless transceivers 30 and automatically joins the network 10, its visual warning signal device 38 may be incorporated into the flash pattern according to program instructions in the controller 18. Warning lights that would otherwise be distracting to officers at the scene can be modified or turned off, while traffic directing signals or illumination lights could be turned on.

The vehicles 12 may also be equipped with at least one sensor 40 for collecting information regarding the vehicle 12 or the environment surrounding the vehicle 12. Sensors 40 include, but are not limited to cameras, radar, ultrasonic or sound based sensors, distance measurement devices, accelerometers, or the like. Sensors 40 may be selected to supplement position sensing equipment such as GPS or DGPS to determine the position of the vehicles 12 relative to each other. One example of a sensor is a radar or proximity detecting device arranged at the front of a vehicle, where the sensor detects the distance between the vehicle and the vehicle ahead. This information can be used to provide the vehicle operator with a warning if the distance between the vehicles is suddenly reduced, indicating a likelihood of collision.

The relative position of nodes (devices) in the disclosed system 200 is used to coordinate the activity of the devices, or nodes on the wireless local network 10. For example, the second (and later) vehicles 12 to arrive at the scene may be configured to extinguish their forward facing warning light signals in favor of forward facing illumination, to improve visibility at the scene. The first and second vehicles 12 may be configured to extinguish their rear facing warning lights, because another vehicle 12 has joined the group and will maintain rear facing warning lights to warn oncoming traffic. In this scenario, the first and second vehicles 12 could be configured to project an alternative warning signal pattern, such as a traffic directing (sequential amber lights), or a steady, low intensity pattern on the rear of each lightbar 38.

Figure 4:
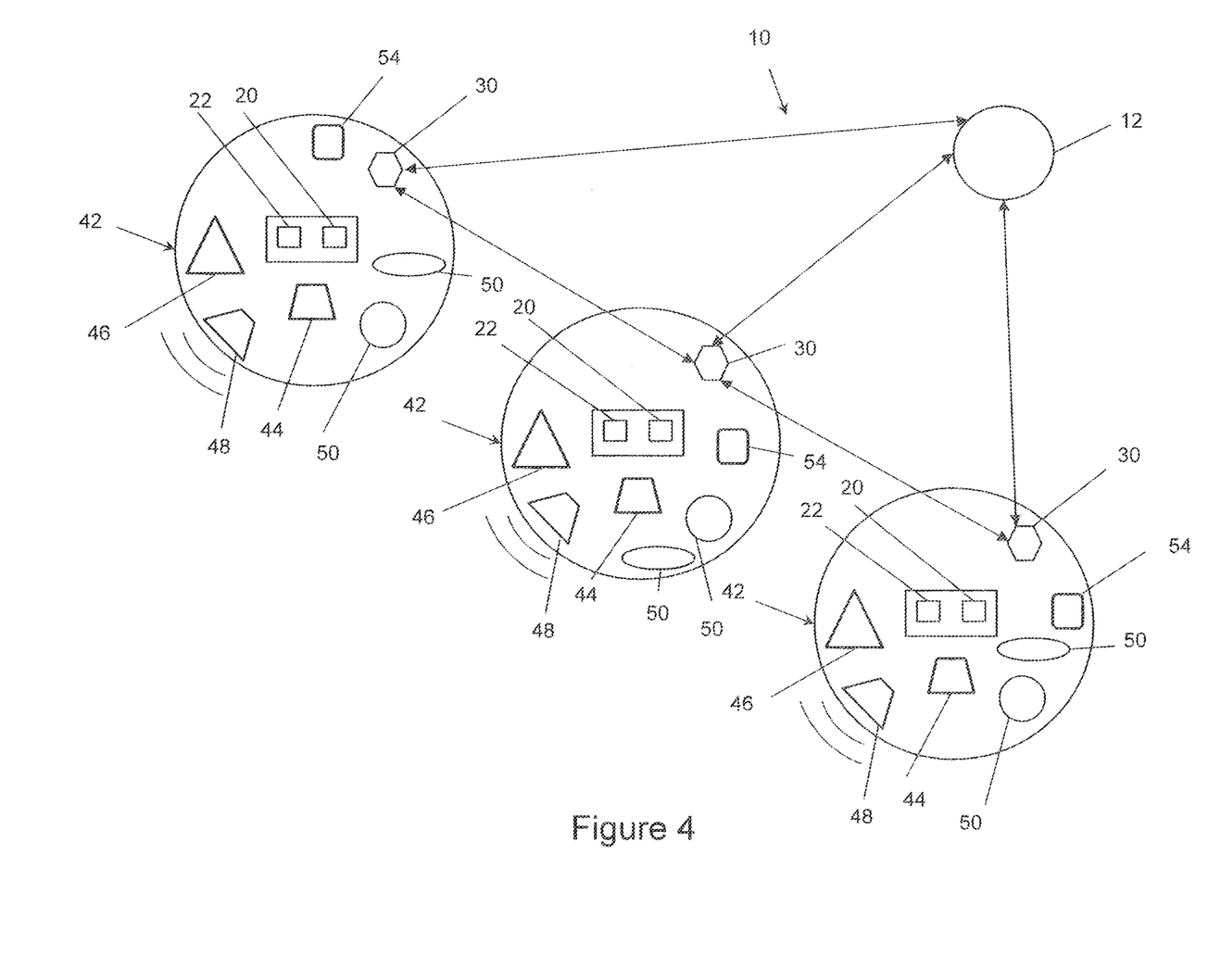
FIG. 4 is a graphical presentation of representative traffic directing cones or barriers suitable for use in the disclosed system and wireless local network.

FIG. 2 also depicts peripheral devices that are nodes on the disclosed wireless local network. An array of traffic directing cones or barriers 42 is shown arranged in a row extending from the rear left corner of the last (rear) vehicle 12. As shown in FIG. 4, each of the cones or barriers 42 includes a power source 44, a controller 19 including a processor 22, memory 20, and a wireless transceiver 30, allowing the cones/barriers 42 to join the self-assembling wireless local network 10. Each of the cones or barriers 42 may also include a visual warning device such as a light 46 for generating visual light signals and/or a speaker or tone generator 48 for generating audible signals. Each of the cones or barriers 42 may also include sensors 40 or other hardware for determining the relative position of the barriers 42 relative to the other barriers 42 and relative to the one or more emergency vehicles 12. The functionality of the cones or barriers 42 may be partly determined by their relative position. For example, the warning lights 46 of each cone 42 may illuminate in a sequential pattern to guide oncoming traffic around the scene. The barriers 42 may be connected to each other by infrared lasers or light beams 50 that allow detection of an object passing between the barriers 42. This feature can be used to form a "virtual fence" around the response scene and the barriers 42 may be configured to alert first responders at the scene of such an intrusion. One or more of the traffic cones or barriers 42 may also include sensors such as radar or laser radar 50 arranged to detect the speed and trajectory of vehicles approaching the response scene, with the system 200 programmed to use information from the radar 50 to calculate the likelihood of an intrusion and provide a warning to first responders at the scene of a vehicle likely to enter the scene. Each of the traffic cones 42 may include an RFID tag 54 to authenticate the cone 42 to the system 200. An authentication token or code may alternatively be provided in firmware or hardware on the cone 42 and exchanged with other nodes on the network 10.

FIG. 2 also depicts a further node on the disclosed wireless local network 10 in the form of a wearable device 52 on the person of a first responder. As shown in greater detail in FIG. 5, the wearable device 52 will include a power source 44, a controller 19 with a processor 22 and memory 20, and a transceiver 30, allowing the wearable device 52 to join the disclosed wireless local network 10. The wearable device 52 may include a haptic device 56 for generating vibrations to alert the first responder to dangerous conditions including an intrusion or likely intrusion of the response scene. The wearable device 52 may include sensors 58 for detecting the condition and orientation of the officer, for example whether the officer is upright and moving or has fallen down and is not moving. The wearable device 52 may detect the vital signs of the officer through one or more sensors 58. The wearable device 52 may include an RFID tag 54 or other mechanism for identifying the particular first responder wearing the device 52. This responder identification can be reported to the wireless local network 10 for the purposes of tracking personnel as they join or depart from a scene, and the condition of those personnel while at the scene. The system 200 and wireless local network 10 may be configured to report and update the identification of vehicles 12 and personnel at a response scene to one or more emergency response coordination centers through the internet and/or via a cellular network. The wearable device 52 may include audible tone generators 48 and a homing beacon 60 to facilitate locating a first responder in the dark, dense foliage, steep vertical terrain, smoke, or other environments where it can be difficult to locate personnel who are possibly unconscious and unable to move. Signal strength from the homing beacon 60 may be employed to direct search efforts in a manner similar to the function of avalanche beacons known in the art. The wearable device 52 may be programmed to report activation of the homing beacon to the wireless local network 10, with the system 200 configured to pass that information along to response coordinators and commanders.

Figure 5:
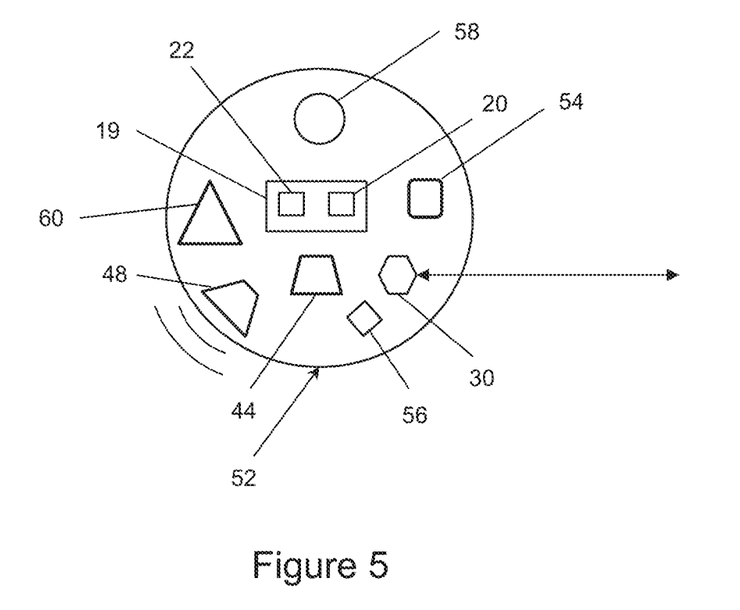
FIG. 5 is a graphical presentation of a representative wearable device suitable for use in the disclosed system and wireless local network.

The wearable device 52 and emergency vehicle 12 can be configured to detect the proximity of the wearable device 52 (and thus the officer) relative to the emergency vehicle 12. Connection of the RFID tag 54 with the vehicle 12 may be used as a proxy for the first responder's presence at the vehicle 12, since the operative range of an RFID tag is relatively small. A system 200 incorporating a vehicle 12 and wearable device 52 may be programmed to enable certain vehicle functionality only when the first responder is present at the vehicle 12. For example, when the wearable device 52 is within a pre-determined distance from the vehicle 12, the vehicle will function normally, but if the wearable device 52 leaves the pre-determined distance (or the vehicle 12 moves beyond the pre-determined distance) the vehicle 12 may be disabled or restricted to limited speed. Other functions of the vehicle 12 may be disabled when the wearable device 52 is not present, such as the trunk lock and/or any locks securing firearms in the vehicle 12. The wearable device 52 can be used to associate a specific officer or officers with a specific vehicle 12 at the beginning of each shift. The command role of the officer may be used to alter the functionality or role of the vehicle 12 as a node on the disclosed wireless local network 10. For example, if the officer is in a command role, then the vehicle 12 may be configured to assume a lead role in the wireless local network 10 and have functionality that is different than other vehicles on the network 10. The wearable device 52 may also include a hardware or software token or other security device, allowing the vehicle occupied by the officer to join adjacent local wireless networks. For example, the command vehicle of a police department or fire department may be authorized to join the adjacent police or fire department wireless network, assuming the command status of the officer has been verified to the local wireless network 10.

All nodes in the disclosed network have some common characteristics: each node includes a processor 22 for executing program instructions, (which may be referred to as a computer processor), machine readable storage media (memory) 20 for storage of program instructions, and a transceiver 30 for receiving and transmitting data on the wireless local network 10. For example, in a Thread network, each node in a mesh network is assigned a role and that role can change depending upon the node's location in the network. As used in this disclosure, location in the network is distinct from the physical location of the device or node relative to the other devices. Each device may be capable of acting as a router, where it can forward data from one node to another. One node (device) may be designated as the leader, and handles certain routing and other information on the network. If the leader in the disclosed network 10 leaves the network, another device is elected leader. According to aspects of the disclosure, the process of joining and leaving the disclosed mesh network is automatic, requiring no human intervention. This allows products compatible with the disclosed wireless local network 10 to form "ad hoc" networks when mesh equipped devices arrive or are deployed at a particular location. The autonomous formation and operation of the disclosed wireless local network 10 and system 200 of connected devices free first responders from some routine functions while supplementing information exchange, first responder and public safety.

According to aspects of the disclosure, the functionality of each device may be altered depending upon the physical location of the device relative to other devices on the wireless local network 10. Various implementations of this concept have been described above with respect to vehicle positions, officer proximity, and devices such as traffic directing cones or barriers 42. Position sensing by GPS may not have the specificity necessary for the system 200 to determine the relative position of the vehicles 12 shown in FIG. 2.

Multiple partitions of the same network can exist at the same time. Each partition may have its own leader and operate independently of any other partitions. Should these partitions come within range of one another, they can merge together seamlessly, and designate a single leader for the merged network. The design of the wireless local network and the program instructions in each node or device will establish rules regarding joining and leaving the network, as well as when and whether adjacent networks merge.

Security of a mesh network is best managed within the organization operating the network and security information for the network should not be shared outside the organization. So it may not be possible for unrelated networks to automatically merge with each other directly as is the case with nodes and devices sharing the same network key. For example, a network operated by a county Sherriff's department may not be able to directly merge with a network operated by a State Police Department, because the security key will not be shared between them. It is possible to establish secure methods of communicating between the disclosed mesh networks via border routers that act as a gateway to the internet where data networks are available. Secure communications can also be established within the network protocol. Examples include software controlled and maintained passwords or tokens. Designated nodes, such as command vehicles, may be allowed to "opt in" to communications with other networks.

Reliable communications and data transfer among devices or nodes in a wireless local network 10 may require a common time reference for synchronization. Further, time synchronization on a wireless network allows for a time division multiple access "TDMA" method to be used over a multi-hop wireless network. One aspect of the disclosed self-assembling network is to wirelessly connect sensors 40, 50, 58 deployed on vehicles 12, personnel or traffic directing equipment 42. Each node (device) may include one or more sensors, a computer processor 22 with memory 20, signal processing, a wireless transceiver 30 and a power source 44 such as a battery with limited capacity. The nodes must quickly report the results to a data collection node or access point. Since the nodes are battery-powered, the medium access control (MAC) protocol is helpful in determining network lifetime. Proposed MAC protocols for sensor networks provide either contention based access or time division multiple access (TDMA). The former, e.g., IEEE 802.11 (carrier sense multiple access CSMA), consume more energy than TDMA protocols because they waste energy in collisions and idle listening. Moreover, they do not give delay guarantees. TDMA protocols are more power efficient since nodes in the network can enter inactive (sleep) states until their allocated time slots. More recent standards, such as IEEE 802.15.4 allow designers to configure their own timing patterns. With regard to channel access, 802.15.4 uses carrier sense multiple access with collision avoidance (CSMA-CA). This multiplexing approach lets multiple users or nodes access the same channel at different times without interference.

Some methods of time synchronization may not be available on a mesh network, because of the inability of the MAC layer to time stamp the exact moment when a message was transmitted/received. This leaves the MAC layer delay, or the time between a message being sent and hitting the air, as completely non-deterministic. One possible method of coordinating timing on the disclosed mesh network is receiver-receiver synchronization (RRS), as is known in the art. In an RRS method, a "reference node" sends a message that is commonly witnessed by more than one receiver at approximately the same time. Receivers then exchange time stamps of this commonly witnessed event. In this synchronization method, the delay on the transmitter side is irrelevant, because multiple receivers detect the message at the same time, establishing a common time reference. RRS in a mesh network requires three devices, one to send and at least two to receive, and the three devices must be "fully meshed" to avoid delays associated with multi-hop communications. The term "fully meshed" refers to a situation in which the three network nodes (devices) involved in the RRS method are connected directly to each of the others.

GPS timing eliminates the need for a minimum of three fully meshed devices for synchronization. Any number of GPS equipped devices can be synchronized, even without a connection to the disclosed wireless local network 10. Where a GPS signal is available, a GPS receiver can provide an accurate time synchronization alternative in the form of a pulse. However, this signal is not always dependable in urban, mountainous terrain or indoor environments. Dedicated GPS timing modules expand timing capabilities into environments where GPS signal is not available. By using a high accuracy temperature-controlled crystal oscillator (TCXO), devices can maintain an accurate clock pulse for extended periods of time after losing GPS signal. In most environments, GPS signals are interrupted for short periods of time by tunnels, garages, and tall buildings and a GPS timing module can be used to provide the necessary time reference among nodes on a mesh network.

Figure 6:
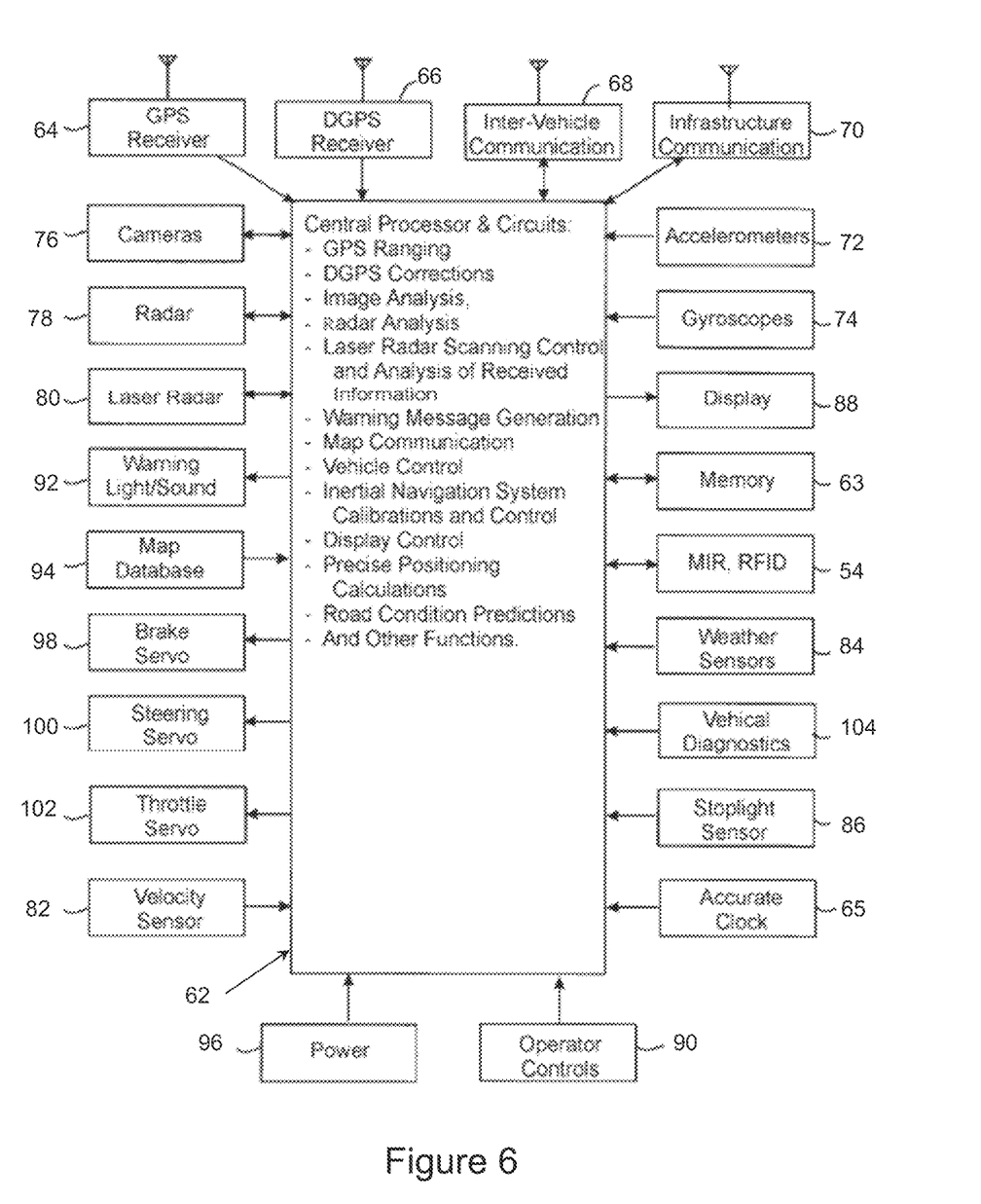
FIG. 6 is a functional block diagram showing a representative vehicle control unit that may interact with the disclosed system and wireless local network.

Modern motor vehicles include advanced electronic systems coordinated by one or more electronic control units. FIG. 6 illustrates a representative control unit 62 and associated peripheral equipment, sensors and vehicle systems. The control unit 62 includes memory 63 for storage of executable computer code, and an accurate clock 65 for coordination of internal vehicle functions. The vehicle may include a GPS receiver 64, a DGPS receiver 66, inter-vehicle communication 68, and infrastructure communication 70 for interacting with smart infrastructure. Vehicle sensors include one or more of accelerometers 72, gyroscopes 74, cameras 76, radar 78, laser radar 80, velocity sensor 82, weather sensors 84 and stoplight sensors 86. The vehicle includes at least one display 88 to provide information, and operator controls 90 to provide inputs to direct vehicle operation. The vehicle may be equipped to generate warning light signals and audible tones 92 perceptible to the operator within the vehicle, or in the case of an emergency vehicle 12, the visual signals and audible tones are perceptible to pedestrians and motorists external to the emergency vehicle 12. Vehicle systems may include a map database 94 for tracking the position of the vehicle on a map that may be displayed to the vehicle operator. Vehicle systems receive electrical power 96 from a vehicle electrical system, which is typically a DC system including a battery and engine-driven alternator as is known in the art. The control unit 62 may communicate with a brake servo 98, steering servo 100, throttle servo 102 and vehicle diagnostics 104. The vehicle may include an RFID 54 or other identifier to provide an electronically readable identifier that can be used in electronic communications and on networks such as the disclosed wireless local network 10.

Computer code running in the vehicle control unit 62 may be configured to process data from some or all of the connected systems and devices to calculate vehicle position and place the vehicle on a map displayed to the operator. The vehicle control unit 62 can supplement GPS and DGPS information with data from vehicle sensors 72, 74, 76, 78, 80, 82 to perform precise positioning calculations and generate warnings to the operator of dangerous vehicle movements or road conditions. According to aspects of the disclosure, the vehicle control unit 62 may share some of the vehicle data, position information, or other data and calculations with a controller 18 associated with the disclosed wireless local network 10 and connected peripheral equipment 42, 52. Alternatively, the disclosed system 200 may include its own sensors 40, 50, 58 and perform calculations separately from the vehicle control unit 62. Each node on the disclosed mesh network can determine its own position using a GPS receiver a DGPS receiver, or one of these supplemented by sensor feedback from accelerometers, gyroscopes, radar or signals from other nodes, and broadcast its position to other nodes on the network.

Refinement of GPS is generally known in the art. The accuracy of GPS and DGPS can be improved by a Wide Area Augmentation System (WAAS), a Local Area Augmentation System (LAAS), or other systems that make use of the carrier phase. Additional details regarding GPS and DGPS accuracy refinement are provided by U.S. Pat. No. 6,405,132 to Breed et. al. Precise positioning is possible by refining a GPS location with the aforementioned vehicle telematics, infrastructure-based location aids, Radio-Frequency Identification ("RFID") tags, cameras, infrared or optical sensors, radar and laser radar, or other sensors that establish relative or absolute location.

Each node may be programmed to maintain a database (or other record) of the current location of other nodes on the network. This information can be used to generate a virtual "map" of the relative positions of nodes on the network, which can be used to coordinate node activity. For example, warning signals generated by emergency vehicles 12 stopped or arriving at a scene can be coordinated to improve safety. A single police car at a scene should employ its warning lights 38a, 38b directed both forward and to the rear to warn oncoming traffic in both directions. However, a second police car arriving at the scene changes the situation, and coordination between the vehicles 12 would allow the rear-facing warning lights 38b of the lead vehicle to be turned off or changed to a less dynamic traffic directing pattern, while the forward facing lights 38a of the rear vehicle could be turned off or changed to illuminate the scene.

Such coordination among nodes on a mesh network may require location accuracy greater than commonly available using GPS alone, which is typically limited to about 3 meters. Location accuracy can be improved by accessing vehicle speed and heading information from the vehicle's internal communication bus, also referred to as a CAN bus. Other position and proximity sensors may be used in tandem with software to determine the relative position and orientation of other vehicles (nodes) on the network. One scenario where relative position and vehicle direction information may be used to improve safety is in a pursuit or response situation where emergency vehicles are following each other. The information could be used to control the warning lights of the leading vehicle, so they do not blind vehicles following close behind. Warning lights could also be configured to warn of sudden braking or deceleration by a lead vehicle to aid in collision avoidance.

Mesh network capability can be added to existing control modules through logic inputs and a network controller. New "scalable" warning signal patterns can be added to existing libraries of warning light signals. Traffic advisor patterns can be sequenced by activating segments at an assigned time slot according to a synchronized time signal available to the nodes (in this case emergency vehicles 12 and/or traffic directing devices 42).

Mesh network connectivity and information transfer can be implemented such that the exchange of information and control is a seamless process handled by the system 200 with little or no human intervention. Network capability can be integrated into existing equipment rather than as an additional add-on system. Nodes are programmed to join and leave the wireless local network 10 according to rules established for the network. The network 10 is configured to be self-assembling and autonomous to a large extent. This frees first responders to do their jobs, while the connected equipment automatically provides safety enhancing functionality. One example is a system 200 programmed to periodically report vehicles 12 and personnel at a particular response scene. Response coordinators will have accurate and timely information about resources at a particular scene, which allows them to assess the need for additional resources or even to re-direct resources to other, higher priority situations.

Another example is a work zone where a vehicle positioned at the beginning of the work zone is equipped with sensors that detect the speed and trajectory of oncoming vehicles. A vehicle that is approaching with excessive speed or on a trajectory that will enter the work zone triggers an alert on the disclosed wireless local network 10. In this scenario, a police officer and workers in the work zone wearing a connected device 52 configured to receive the alert, are provided with audible and/or vibratory signals of the anticipated intrusion. Such a warning may provide valuable time for personnel in the work zone to take evasive action. Additionally, a wearable device 52 could implement motion sensors such as an accelerometer to detect a situation where a worker or officer falls to the ground. In a law enforcement situation, this event could trigger opening a vehicle door to permit a police dog to assist the officer or trigger a specific pattern of light and/or sirens to draw attention to the scene. Wearable connected devices can also be configured to report health and status information for personnel, such as heart rate and issue alerts when such information indicates a need for assistance.

The proposed wireless local network 10 could be extended inside a structure by way of portable and wearable nodes, to aid in tracking the location of emergency personnel. In this embodiment, the nodes may include waypoints such as a wedge deployed to hold a door open, and wearable devices 52 on personnel moving within the structure. This embodiment of the disclosed wireless local network would employ the same infrastructure as that described above for the other embodiments, and would connect sensors, wearable devices and waypoints dynamically. Position sensing may be used to track the location of personnel within the structure, including elevation. Wearable devices 52 can monitor conditions such as temperature, compounds in the air, vital signs of personnel, and report this information to situation managers outside of the building. Knowing the location of personnel within a structure can aid in assisting personnel in distress, and may be used to direct personnel how to get out of a dangerous situation.

Figure 7:
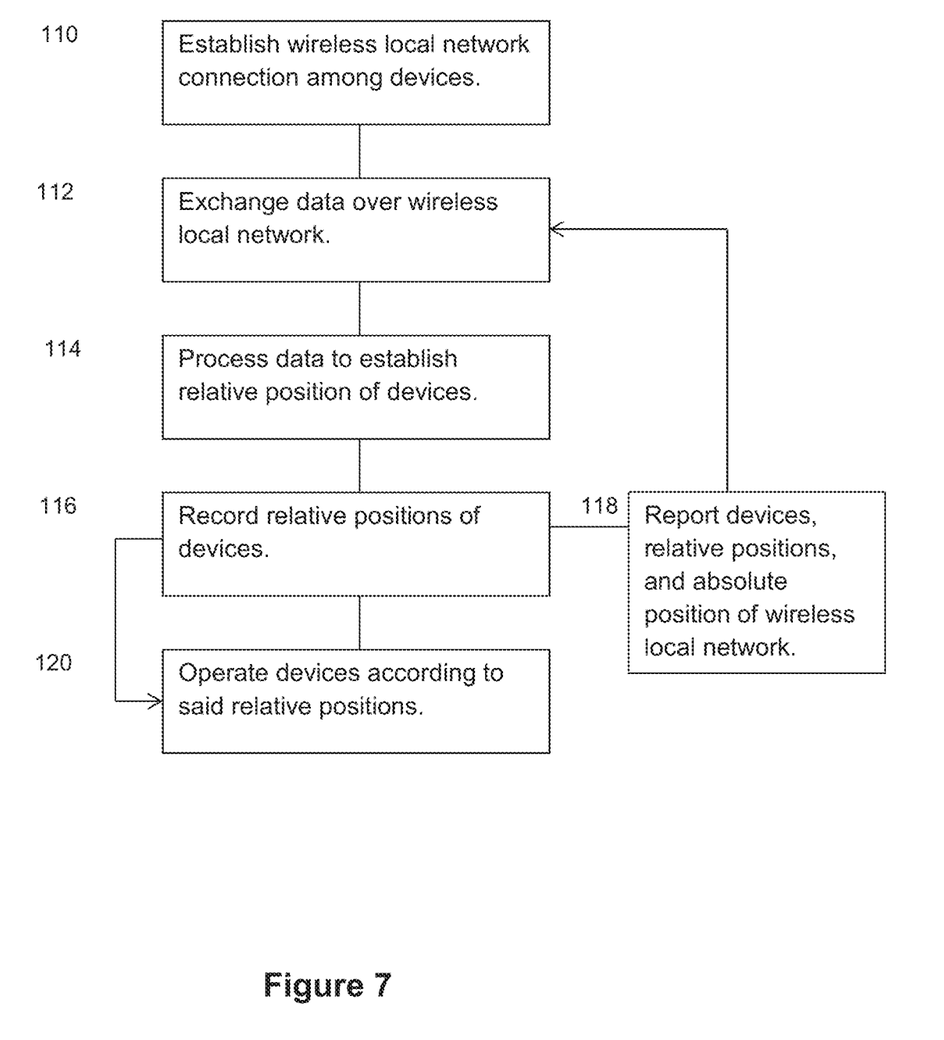
FIG. 7 is a block diagram of representative steps in a method of operating a system according to aspects of the disclosure.

FIG. 7 illustrates representative steps in a method of operating a system of devices on a wireless local network according to aspects of the disclosure. The devices are configured to automatically join a local wireless network of compatible devices, which include at least one emergency vehicle, at step 110. The devices transmit data across the network at step 112. The system processes data from the connected devices to determine the position of said devices relative to each other at step 114. The system records the relative positions of the connected devices at step 116, and transmits identification of the devices and their positions at step 118 to a command center remote from the wireless local network. This transmission of devices and positions at step 118 may also include the absolute position, corresponding to the location on a map, of the one or more emergency vehicles included in the wireless local network. The system operates the connected devices according to their relative position at step 120. Alternative functionality based on position is described in greater detail above. The system is programmed to periodically repeat steps 112-118 to ensure that information regarding vehicles and devices at a response scene is accurate as conditions change. Step 120 employs the updated device and position information to alter the operation of devices on the network according to the latest device and position information.

What is claimed:

1. A system for managing a plurality of warning devices associated with emergency vehicles, comprising:
   a first warning device for a first emergency vehicle having a first plurality of warning functions controlled by a first controller, the first controller communicating over a wireless network via a first transceiver;
   a first sensor providing a position of the first emergency vehicle;
   a second warning device for a second emergency vehicle having a second plurality of warning functions controlled by a second controller, the second controller communicating over the wireless network via a second transceiver;
   a second sensor providing a position of the second emergency vehicle;
   wherein the first and second transceivers communicate data with one another via the wireless network to indicate relative positions of the first and second emergency vehicles, and each of the first and second controllers controls a respective warning function in response to the relative positions of the first and second emergency vehicles.

2. The system of claim 1, wherein each of the first and the second warning devices include warning lights, wherein each of the first and the second plurality of warning functions include light patterns, wherein the first controller activates a light pattern in the first warning device different from a light pattern activated in the second warning device in response to the relative positions.

3. The system of claim 2, wherein the light pattern activated in the first warning device complements the light pattern activated in the second warning device.

4. The system of claim 1, wherein the first controller activates one of the first plurality of warning functions and the second controller deactivates one of the second plurality of warning functions in response to the relative positions.

5. The system of claim 1, wherein each of the first and the second warning devices include a front-facing row of warning lights and a rear-facing row of warning lights, wherein the first controller deactivates one of the front-facing or the rear-facing rows of warning lights in the first warning device in response to the relative positions.

6. The system of claim 1, wherein the data communicated over the wireless network includes a status of at least one of the first or the second emergency vehicle.

7. The system of claim 6, wherein the first controller further controls a warning function of the first warning device in response to the status of the second emergency vehicle.

8. The system of claim 6, wherein the status includes at least one of a speed, a heading, or a braking status of the at least one of the first or the second emergency vehicle.

9. The system of claim 1, wherein each of the first and the second sensors is a GPS sensor.

10. The system of claim 1, further comprising a third warning device independent from any emergency vehicle having a third plurality of warning functions controlled by a third controller, the third controller communicating over the wireless network via a third transceiver;
wherein the third transceiver communicates data with at least one of the first or second transceivers via the wireless network to indicate a relative position of the third warning device to at least one of the first or second emergency vehicles, and the third controller controls a respective warning function in response to the relative position of the third warning device.

11. The system of claim 10, wherein the third warning device is one of a traffic cone or a traffic barrier.

12. A warning system for an emergency vehicle, comprising:
at least one warning device having a plurality of warning functions;
a controller controlling the plurality of warning functions of the at least one warning device and communicating over a wireless network via a transceiver;
the controller receiving data from at least one sensor, the data including a position and a status of the emergency vehicle;
the transceiver communicating the data, and receiving data concerning at least one of a position and a status of a second emergency vehicle, over the wireless network to indicate relative positions of the emergency vehicle and the second emergency vehicle, the controller controlling a warning function of the at least one warning device in response to the relative positions.

13. The system of claim 12, wherein the controller further controls a warning function of the at least one warning device in response to the status of the second emergency vehicle.

14. The system of claim 13, wherein the status includes at least one of a speed, a heading, or a braking status.

15. The system of claim 12, wherein the at least one warning device includes a visual warning device and an audio warning device.

16. The system of claim 12, wherein the controller activates a warning function of the at least one warning device different from a warning function activated in a warning device of the second emergency vehicle in response to the relative positions.

17. The system of claim 12, wherein the at least one warning device include warning lights and the plurality of warning functions include light patterns, wherein the controller activates a light pattern in the at least one warning device different from a light pattern activated in a warning device of the second emergency vehicle in response to the relative positions.

18. The system of claim 12, wherein the light pattern activated in the first warning device complements the light pattern activated in the warning device of the second emergency vehicle.

19. The system of claim 12, wherein the controller deactivates one of the first plurality of warning functions in response to the relative positions.

20. The system of claim 12, wherein the at least one warning device include a front-facing row of warning lights and a rear-facing row of warning lights, wherein the controller deactivates one of the front-facing or the rear-facing rows of warning lights in response to the relative positions.

* * * * *